US011062486B2

(12) United States Patent
Gao

(10) Patent No.: US 11,062,486 B2
(45) Date of Patent: Jul. 13, 2021

(54) METHODS AND APPARATUS FOR DEEP LEARNING BASED DATA TRANSFER BETWEEN IMAGING SYSTEMS

(71) Applicant: Siemens Medical Solutions USA, Inc., Malvern, PA (US)

(72) Inventor: Fei Gao, Knoxville, TN (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 67 days.

(21) Appl. No.: 16/658,329

(22) Filed: Oct. 21, 2019

(65) Prior Publication Data
US 2021/0118197 A1 Apr. 22, 2021

(51) Int. Cl.
G06T 11/00 (2006.01)
G06T 5/50 (2006.01)
G06K 9/62 (2006.01)
G06N 3/08 (2006.01)
G06F 17/15 (2006.01)

(52) U.S. Cl.
CPC ............ *G06T 11/003* (2013.01); *G06F 17/15* (2013.01); *G06K 9/6267* (2013.01); *G06N 3/08* (2013.01); *G06T 5/50* (2013.01); *G06T 2207/10081* (2013.01); *G06T 2207/10088* (2013.01); *G06T 2207/10104* (2013.01); *G06T 2207/20081* (2013.01); *G06T 2207/20084* (2013.01); *G06T 2207/20221* (2013.01)

(58) Field of Classification Search
None
See application file for complete search history.

(56) References Cited

U.S. PATENT DOCUMENTS

| 10,176,405 | B1* | 1/2019 | Zhou | G06K 9/6269 |
| 10,504,268 | B1* | 12/2019 | Huang | G06K 9/00302 |
| 2017/0351935 | A1* | 12/2017 | Liu | G06K 9/6256 |
| 2018/0271430 | A1* | 9/2018 | Ramella-Roman | A61B 5/435 |
| 2018/0330511 | A1* | 11/2018 | Ha | G06K 9/6247 |
| 2019/0021677 | A1* | 1/2019 | Grbic | A61B 5/7267 |
| 2019/0066281 | A1* | 2/2019 | Zheng | G06K 9/6256 |
| 2019/0318474 | A1* | 10/2019 | Han | G06K 9/6267 |
| 2019/0333199 | A1* | 10/2019 | Ozcan | G06N 3/088 |
| 2019/0333623 | A1* | 10/2019 | Hibbard | A61N 5/1031 |
| 2020/0184660 | A1* | 6/2020 | Shi | G06T 7/30 |

OTHER PUBLICATIONS

Benoit, Didier, et al. "PET/MR: improvement of the UTE μ-maps using modified MLAA." EJNMMI physics., 2015.

(Continued)

*Primary Examiner* — Jiangeng Sun

(57) ABSTRACT

Systems and methods of image reconstruction are disclosed. First image scan data corresponding to a first imaging modality is obtained. One or more deep learning processes are applied to the first image scan data, where the one or more deep learning processes are trained based on first image scan data corresponding to a second imaging modality, to generate second image scan data corresponding to the first imaging modality. An image is then reconstructed based on the first image scan data and the second image scan data corresponding to the first imaging modality.

20 Claims, 9 Drawing Sheets

(56) References Cited

OTHER PUBLICATIONS

Mahmood, Faisal, et al. "Unsupervised reverse domain adaptation for synthetic medical images via adversarial training." IEEE TMI (2018).

Wolterink, Jelmer M., et al. "Deep MR to CT synthesis using unpaired data." International Workshop on Simulation and Synthesis in Medical Imaging. Springer, Cham, 2017.

Zhang, Zizhao, Lin Yang, and Yefeng Zheng. "Translating and segmenting multimodal medical volumes with cycle- and shape-consistency generative adversarial network." Proceedings of the IEEE Conference on Computer Vision and Pattern Recognition. 2018.

* cited by examiner

METHODS AND APPARATUS FOR DEEP LEARNING BASED DATA TRANSFER BETWEEN IMAGING SYSTEMS

FIELD

Aspects of the present disclosure relate in general to nuclear imaging systems and, more particularly, to systems and methods for transferring information between positron emission tomography (PET)/computed tomography (CT) scan systems and PET/magnetic resonance (MR) systems.

BACKGROUND

Positron emission tomography (PET) is a nuclear medicine imaging technique that produces a three-dimensional image representing the distribution of positron emitting isotopes within a body. Computed tomography (CT) is an imaging technique that uses rotating x-ray equipment to obtain images, such as of a person's body. Some systems (e.g., PET/CT systems) combine images from PET and CT scanners during an image fusion process to produce images that show information from both a PET scan and a CT scan. Typically, a CT scan is followed by a PET scan when obtaining the images.

Magnetic resonance (MR) is an imaging technique that uses magnetic fields to generate images. Some systems (e.g., PET/MR systems) combine images from PET and MR scanners during an image fusion process to produce images that show information from both a PET scan and an MR scan. Typically, the PET and MR scans are performed simultaneously.

PET/CT and PET/MR systems each have advantages over the other. For example, PET/CT images are typically more useful for obtaining images of hard tissue (e.g., bones), whereas PET/MR images are typically more useful for obtaining images of soft tissue (e.g., an organ such as a brain, heart, muscles, tendons, ligaments, fascia, nerves, fibrous tissues, fat, blood vessels, and synovial membranes). In addition, PET/CT images typically have a larger trans axial field of view of the body compared to PET/MR images, which typically have a comparatively smaller trans axial field of view. For example, PET/CT images can illustrate a larger portion of a body than would a PET/MR scan. As such, there are opportunities to address deficiencies of PET/CT and PET/MR systems.

SUMMARY

In some embodiments, a computer-implemented method of training an image feature detection function is disclosed. The method can include receiving first image scan data corresponding to a first imaging modality and second image scan data corresponding to a second imaging modality. The method can also include applying at least one feature detection function to the received first image scan data to identify at least one feature in the first image scan data. The method can further include determining a first classification of the at least one feature in the first image scan data and a second classification of at least one feature of the second image scan data. The method can also include determining whether the first classification of the at least one feature in the first image scan data corresponds to the second classification of the at least one feature of the second image scan data. The method can further include training the at least one feature detection function based on the determination of whether the first classification of the at least one feature in the first image scan data corresponds to the second classification of the at least one feature of the second image scan data. The first imaging modality can be PET from a PET/CT scanner, or PET from a PET/MR scanner, for example. The second imaging modality can be CT from a PET/CT scanner, or MR from a PET/MR scanner, for example.

In some embodiments, a computer-implemented method of nuclear imaging is disclosed. The method can include receiving first image scan data corresponding to a first imaging modality. The method can also include applying at least one trained feature detection function to the received first image scan data to generate virtual image data identifying at least one feature in the first image scan data. The at least one trained feature detection function can be trained based on training data identifying whether classifications of features corresponding to a second imaging modality and a third imaging modality correspond to each other. The method can further include receiving second image scan data corresponding to a fourth imaging modality. The method can also include determining a first classification of the at least one feature in the virtual image data and a second classification of at least one feature in the received second image scan data. The method can further include generating third image scan data (e.g., MR mu-map, CT mu-map) based on the first classification and the second classification. In some examples, the method can include generating an image (e.g., PET/MR image, PET/CT image) based on the virtual image data and the second image scan data. Each of the first imaging modality and second imaging modality can be PET from a PET/CT scanner, or PET from a PET/MR scanner, for example. The third imaging modality can be CT from a PET/CT scanner, while the fourth imaging modality can be MR from a PET/MR scanner, for example. In some examples, the third imaging modality can be MR from a PET/MR scanner, while the fourth imaging modality can be CT from a PET/CT scanner, for example.

In some embodiments, a non-transitory computer readable medium stores instructions that, when executed by at least one processor, cause the at least one processor to perform operations comprising receiving first image scan data corresponding to a first imaging modality and second image scan data corresponding to a second imaging modality. The operations can also include applying at least one feature detection function to the received first image scan data to identify at least one feature in the first image scan data. The operations can further include determining a first classification of the at least one feature in the first image scan data and a second classification of at least one feature of the second image scan data. The operations can also include determining whether the first classification of the at least one feature in the first image scan data corresponds to the second classification of the at least one feature of the second image scan data. The operations can further include training the at least one feature detection function based on the determination of whether the first classification of the at least one feature in the first image scan data corresponds to the second classification of the at least one feature of the second image scan data. The first imaging modality can be PET from a PET/CT scanner, or PET from a PET/MR scanner, for example. The second imaging modality can be CT from a PET/CT scanner, or MR from a PET/MR scanner, for example.

In some embodiments, a non-transitory computer readable medium stores instructions that, when executed by at least one processor, cause the at least one processor to perform operations comprising receiving first image scan data corresponding to a first imaging modality. The operations can also include applying at least one trained feature detection function to the received first image scan data to generate virtual image data identifying at least one feature in the first image scan data. The at least one trained feature detection function can be trained based on training data identifying whether classifications of features corresponding to a second imaging modality and a third imaging modality correspond to each other. The operations can further include receiving second image scan data corresponding to a fourth imaging modality. The operations can also include determining a first classification of the at least one feature in the virtual image data and a second classification of at least one feature in the received second image scan data. The operations can further include generating third image scan data (e.g., MR mu-map, CT mu-map) based on the first classification and the second classification. In some examples, the operations generating an image (e.g., PET/MR image, PET/CT image) based on the virtual image data and the second image scan data. Each of the first imaging modality and second imaging modality can be PET from a PET/CT scanner, or PET from a PET/MR scanner, for example. The third imaging modality can be CT from a PET/CT scanner, while the fourth imaging modality can be MR from a PET/MR scanner, for example. In some examples, the third imaging modality can be MR from a PET/MR scanner, while the fourth imaging modality can be CT from a PET/CT scanner, for example.

In some embodiments, a nuclear imaging system is disclosed. The system includes an imaging scanner configured to provide first image scan data corresponding to a first imaging modality and second image scan data corresponding to a second imaging modality. The system also includes at least one processor configured to receive the first image scan data corresponding to the first imaging modality and the second image scan data corresponding to the second imaging modality from the imaging scanner. The at least one processor can also be configured to apply at least one feature detection function to the received first image scan data to identify at least one feature in the first image scan data. The at least one processor can further be configured to determine a first classification of the at least one feature in the first image scan data and a second classification of at least one feature of the second image scan data. The at least one processor can also be configured to determine whether the first classification of the at least one feature in the first image scan data corresponds to the second classification of the at least one feature of the second image scan data. The at least one processor can further be configured to train the at least one feature detection function based on the determination of whether the first classification of the at least one feature in the first image scan data corresponds to the second classification of the at least one feature of the second image scan data. The first imaging modality can be PET from a PET/CT scanner, or PET from a PET/MR scanner, for example. The second imaging modality can be CT from a PET/CT scanner, or MR from a PET/MR scanner, for example.

In some embodiments, a nuclear imaging system is disclosed. The system includes an imaging scanner configured to provide first image scan data corresponding to a first imaging modality and second image scan data corresponding to a second imaging modality. The system can also include at least one processor configured to receive the first image scan data corresponding to the first imaging modality from the imaging scanner. The processor can also be configured to apply at least one trained feature detection function to the received first image scan data to generate virtual image data identifying at least one feature in the first image scan data. The at least one trained feature detection function is trained based on training data identifying whether classifications of features corresponding to a third imaging modality and a fourth imaging modality correspond to each other. The at least one processor can further be configured to receive the second image scan data corresponding to the second imaging modality from the imaging scanner. The at least one processor can also be configured to determine a first classification of the at least one feature in the virtual image data and a second classification of at least one feature in the received second image scan data. The at least one processor can further be configured to generate third image scan data (e.g., MR mu-map, CT mu-map) based on the first classification and the second classification. In some examples, at least one processor is configured to generate an image (e.g., PET/MR image, PET/CT image) based on the virtual image data and the second image scan data. Each of the first imaging modality and second imaging modality can be PET from a PET/CT scanner, or PET from a PET/MR scanner, for example. The third imaging modality can be CT from a PET/CT scanner, while the fourth imaging modality can be MR from a PET/MR scanner, for example. In some examples, the third imaging modality can be MR from a PET/MR scanner, while the fourth imaging modality can be CT from a PET/CT scanner, for example.

BRIEF DESCRIPTION OF THE DRAWINGS

The following will be apparent from elements of the figures, which are provided for illustrative purposes and are not necessarily drawn to scale.

DETAILED DESCRIPTION

This description of the exemplary embodiments is intended to be read in connection with the accompanying drawings, which are to be considered part of the entire written description.

The exemplary embodiments are described with respect to the claimed systems as well as with respect to the claimed methods. Features, advantages or alternative embodiments herein can be assigned to the other claimed objects and vice versa. In other words, claims for the providing systems can be improved with features described or claimed in the context of the methods. In addition, the functional features of described or claimed methods are embodied by objective units of a providing system.

Furthermore, the exemplary embodiments are described with respect to methods and systems for image reconstruction, as well as with respect to methods and systems for training functions used for image reconstruction. Features, advantages or alternative embodiments herein can be assigned to the other claimed objects and vice versa. In other words, claims for methods and systems for training image reconstruction functions can be improved with features described or claimed in context of the methods and systems for image reconstruction, and vice versa.

Various embodiments of the present disclosure can employ deep learning methods or processes to transfer and incorporate knowledge between PET/CT and PET/MR scanners. For example, the embodiments can employ deep learning methods or processes to classify image data in one scanning system (e.g., a PET/CT scanning system), and transfer the classifications to another scanning system (e.g., a PET/MR scanning system) to reconstruct images.

In some embodiments, a PET/CT scanner generates a first PET image (e.g., a PET sinogram) and a first CT image (e.g., a CT mu-map). Features of the first PET image and of the first CT image are detected and classified. A determination is then made as to whether the classifications match. For example, a determination is made as to whether a classified feature from the first PET image matches a classified feature of the first CT image. The matching determinations are used to retrain (e.g., in real time) classifiers classifying at least one of the first PET images and the first CT images. A PET/MR scanner can generate a second PET image and an MR image (e.g., an MR mu-map). A second CT image is generated based on the second PET image and the first CT image. Based on the MR image, the second PET image, and the second CT image, a PET/MR image is constructed.

Figure 1:
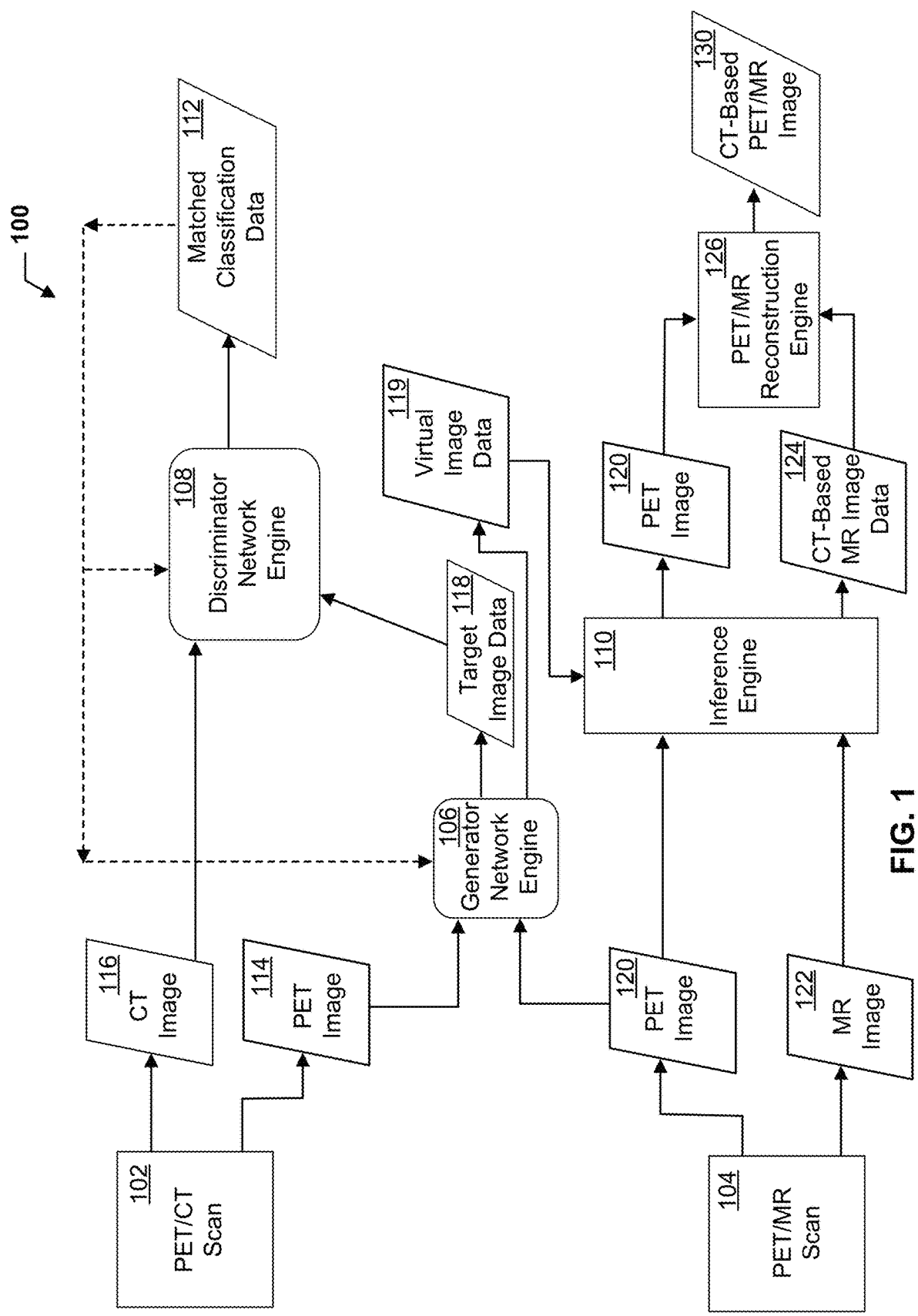
FIG. 1 illustrates a nuclear imaging system, in accordance with some embodiments.

FIG. 1 illustrates one embodiment of a nuclear imaging system 100. Nuclear imaging system 100 includes a PET/CT scanner 102 and a PET/MR scanner 104. PET/CT scanner 102 is operable to perform scans and generate PET and/or CT images. For example, PET/CT scanner 102 can generate PET sinogram data and CT mu-map data. PET/MR scanner 104 is operable to perform scans and generate PET and/or MR images (e.g., MRI images). For example, PET/MR scanner 104 can generate PET sinogram data and MR mu-map data.

Nuclear imaging system 100 further includes a generator network engine 106, a discriminator network engine 108, an inference engine 110, and a PET/MR reconstruction engine 126. In some examples, one or more of these engines can be implemented in one or more field-programmable gate arrays (FPGAs), one or more application-specific integrated circuits (ASICs), one or more state machines, digital circuitry, or any other suitable circuitry. In some examples, parts or all of each one of these engines can be implemented in software as executable instructions such that, when executed by one or more processors, cause the one or more processors to perform the respective functions.

In this example, generator network engine 106 receives PET image 114 from PET/CT scanner 102, and generates target image data 118 identifying features in PET image 114. For example, target image data 118 can identify a mu-map. Generator network engine 106 can employ a deep neural network, such as a generative adversarial network (GAN), to generate target image data 118. Target image data 118 can include, for example, image data with the detected PET image 114 features.

Discriminator network engine 108 receives target image data 118 from generator network engine 106, and classifies the identified features. Similarly, discriminator network engine 108 receives CT image 116 from PET/CT scanner 102, detects features in CT image 116, and classifies the detected features of CT image 116. Discriminator network engine 108 can classify the features identified in each of target image data 118 and CT image 116 based on applying one or more machine learning processes (e.g., algorithms). For example, discriminator network engine 108 can apply a convolutional neural network (CNN) to target image data 118 to classify detected features. Similarly, discriminator network engine 108 can apply the CNN to CT image data 116 to classify detected features.

Discriminator network engine 108 can then determine if a classified feature of target image data 118 corresponds to a classified feature of CT image data 116. For example, discriminator network engine 108 can compare a classified feature of target image data 118 to a classified feature of CT image data 116 to determine if they match (e.g., they are classified as the same feature). Discriminator network engine 108 generates matched classification data 112 identifying whether the classifications of a feature matched. For example, matched classification data 112 can include a "1" if the classifications matched, and a "0" if the classifications did not match. In some examples, matched classification data 112 can provide a range of values (e.g., 0 to 1). A value at or above a threshold (e.g., 0.95) indicates that the classifications matched, while a value below the threshold indicates the classifications did not match. Matched classification data 112 can further identify each of the classifications, for example.

Discriminator network engine 108 can train a classifier based on matched classification data 112. For example, discriminator network engine 108 can train the classifier (e.g., in real time) used to classify features in target generated data 118 or CT image 116. The trained classifier can be based on a neural network, a convolutional neural network, a deep convolutional neural network, or any other suitable machine learning process.

In addition, generator network engine 106 can train the deep neural network (e.g., GAN) based on (e.g., with) matched classification data 112. For example, generator network engine 106 can update parameters (e.g., algorithm parameters) used to detect features in PET image 114 based on matched classification data 112. In some examples, the parameters are assigned weights based on whether matched classification data 112 indicates the classifications matched. For example, higher weights can be assigned for higher probabilities of a match (e.g., based on matched classification data 112), and lower weights can be assigned for lower probabilities of a match. In some examples, generator network 106 and discriminator network 108 are trained with predefined image data until convergence.

Generator network engine 106 can also receive PET image 120 from PET/MR scanner 104, and generates virtual image data 119 identifying features in PET image 120. For example, generator network engine 106 can be iteratively trained (e.g., its algorithms trained) with identifying features in PET images 114 from PET/CT scanner 102. Based on the training, generator network engine 106 can identify features in PET image 120.

Inference engine 110 receives virtual image data 119 from generator network 106. Inference engine 110 also receives PET image 120, and MR image 122, each of which is generated by PET/MR scanner 104. Inference engine 110 can apply one or more deep learning processes to virtual image data 119, PET image 120, and MR image 122 to generate CT-based MR image data 124. CT-based MR image data 124 can identify a CT-based MR image (e.g., MR mu-map).

To generate CT-based MR image data 124, inference engine 110 can classify features in virtual image data 119 and MR image 122. Inference engine 110 can employ, for example, a neural network, a CNN, or a deep convolutional network to classify detected features. Inference engine 110 can then combine image features from either virtual image data 119 or MR image 122 with PET image 120 based on the classifications to generate a CT-based MR image. There are advantages to combining image features from either virtual image data 119 or MR image 122. For example, by combining PET image 120, generated images can be aligned with MR image 122 despite patient movement (e.g., due to respiratory motion). PET image 120 can also be combined to assist in determining whether organs are to be classified as soft or hard. For example, via land marking and segmenting PET image 120, a list and position of organs can be generated. The organs can be classified as soft or hard based on the list and position of each organ.

For example, inference engine 110 can compare classifications from virtual image data 119 and MR image 122 to determine which classification is more appropriate for a current scan. Determining which classification is more appropriate can be based on one or more predefined rules. For example, land marking and segmentation results are computed based on PET image 120. The land marking and segmentation results, along with the scan protocol (e.g., a brain scan), is used to determine the predefined rules. For example, the predefined rules can indicate that CT images are used for skull images, and MR images are used for brain images. As an example, and assuming a current scan is for scanning bone structure, inference engine 110 can extract image features from virtual image data 119 and MR image 122 indicating "bone" classifications. If, for example, virtual image data 119 identifies bone classifications, and MR image 122 does not identify bone classifications, inference engine 110 will use the image features classified as bones from virtual image data 119 to generate the CT-based MR image identified by CT-based MR image data 124.

Inference engine 110 provides CT-based MR image data 124 and PET image 120 to PET/MR reconstruction engine 126 to generate CT-based PET/MR image 130. For example, PET/MR reconstruction engine 126 can perform (e.g., execute) any suitable image fusion process to combine CT-based MR image data 124 with PET image 120 to generate CT-based PET/MR image 130.

Figure 2:
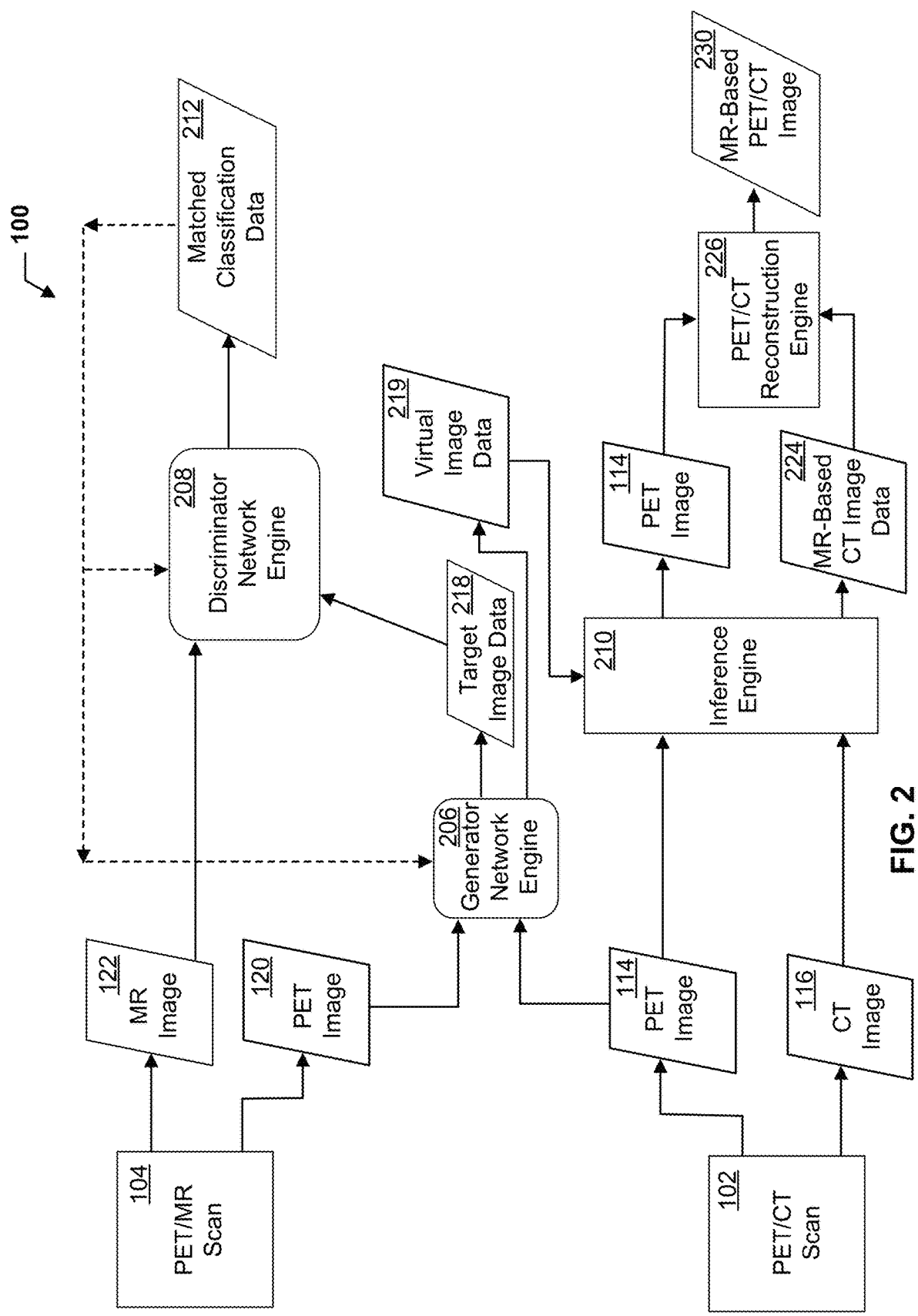
FIG. 2 illustrates another nuclear imaging system, in accordance with some embodiments.

FIG. 2 illustrates one embodiment of a nuclear imaging system 200. Nuclear imaging system 200 also includes a PET/CT scanner 102 and a PET/MR scanner 104. PET/CT scanner 102 is operable to perform scans and generate PET and/or CT images. For example, PET/CT scanner 102 can generate PET sinogram data and CT mu-map data. PET/MR scanner 104 is operable to perform scans and generate PET and/or MR images (e.g., MRI images). For example, PET/MR scanner 104 can generate PET sinogram data and MR mu-map data.

Nuclear imaging system 200 further includes a generator network engine 206, a discriminator network engine 208, an inference engine 210, and a PET/CT reconstruction engine 226. In some examples, one or more of these engines can be implemented in one or more field-programmable gate arrays (FPGAs), one or more application-specific integrated circuits (ASICs), one or more state machines, digital circuitry, or any other suitable circuitry. In some examples, parts or all of each one of these engines can be implemented in software as executable instructions such that, when executed by one or more processors, cause the one or more processors to perform the respective functions.

In this example, generator network engine 206 receives PET image 120 from PET/MR scanner 104, and generates target image data 218 identifying features in PET image 120. For example, target image data 218 can identify a mu-map. Generator network engine 206 can employ a deep neural network, such as a generative adversarial network (GAN), to generate target image data 218. Target image data 218 can include, for example, image data with the detected PET image 120 features.

Discriminator network engine 208 receives target image data 218 from generator network engine 206, and classifies the identified features. Similarly, discriminator network engine 208 receives MR image 122 from PET/MR scanner 104, and classifies features identified in MR image 122. Discriminator network engine 208 can classify the features identified in each of target image data 218 and MR image 122 based on applying one or more machine learning processes (e.g., algorithms). For example, discriminator network engine 208 can apply a convolutional neural network (CNN) to target image data 218 to classify detected features. Similarly, discriminator network engine 208 can apply the CNN to MR image data 122 to classify detected features.

Discriminator network engine 208 can then determine if a classified feature of target image data 218 corresponds to a classified feature of MR image data 122. For example, discriminator network engine 208 can compare a classified feature of target image data 218 to a classified feature of MR image data 122 to determine if they match (e.g., they are classified as the same feature). Discriminator network engine 208 generates matched classification data 212 identifying whether the classifications of a feature matched. For example, matched classification data 212 can include a "1" if the classifications matched, and a "0" if the classifications did not match. Matched classification data 212 can further identify each of the classifications, for example.

Discriminator network engine 208 can train a classifier based on matched classification data 212. For example, discriminator network engine 208 can train the classifier (e.g., in real time) used to classify features in target generated data 218 or MR image 122. In addition, generator network engine 206 can train the deep neural network (e.g., GAN) based on matched classification data 212. For example, generator network engine 206 can update parameters (e.g., algorithm parameters) used to detect features in PET image 120 based on matched classification data 212. In some examples, generator network 206 and discriminator network 208 are trained with predefined image data until convergence.

Generator network engine 206 can also receive PET image 114 from PET/CT scanner 102, and generates virtual image data 219 identifying features in PET image 114. For example, generator network engine 206 can be iteratively trained (e.g., its algorithms trained) with identifying features in PET images 120 from PET/MR scanner 104. Based on the training, generator network engine 206 can identify features in PET image 114.

Inference engine 210 receives virtual image data 219 from generator network 206. Inference engine 210 also receives PET image 114, and CT image 116, each of which is generated by PET/CT scanner 102. Inference engine 210 can apply one or more deep learning processes to virtual image data 219, PET image 114, and CT image 116 to generate MR-based CT image data 224. MR-based CT image data 224 can identify an MR-based CT image (e.g., CT mu-map).

To generate MR-based CT image data 224, inference engine 210 can classify features in virtual image data 219 and CT image 116. Inference engine 210 can employ, for example, a CNN to classify detected features. Inference engine 210 can then combine image features from either virtual image data 219 or CT image 116 with PET image 114 based on the classifications to generate an MR-based CT image. For example, inference engine 210 can compare classifications from virtual image data 219 and CT image 116 to determine which classification is more appropriate for a current scan. As an example, and assuming a current scan is for determining soft tissue, inference engine 210 can extract image features from virtual image data 219 and CT image 116 indicating "soft tissue" classifications. If, for example, virtual image data 219 identifies soft tissue classifications, and CT image 116 does not identify soft tissue classifications, inference engine 210 will use the image features classified as soft tissues from virtual image data 219 to generate the MR-based CT image identified by MR-based CT image data 224.

Inference engine 210 provides MR-based CT image data 224 and PET image 114 to PET/CT reconstruction engine 226 to generate MR-based PET/CT image 230. For example, PET/CT reconstruction engine 226 can perform (e.g., execute) any suitable image fusion process to combine MR-based CT image data 224 with PET image 114 to generate MR-based PET/CT image 230.

Figure 3:
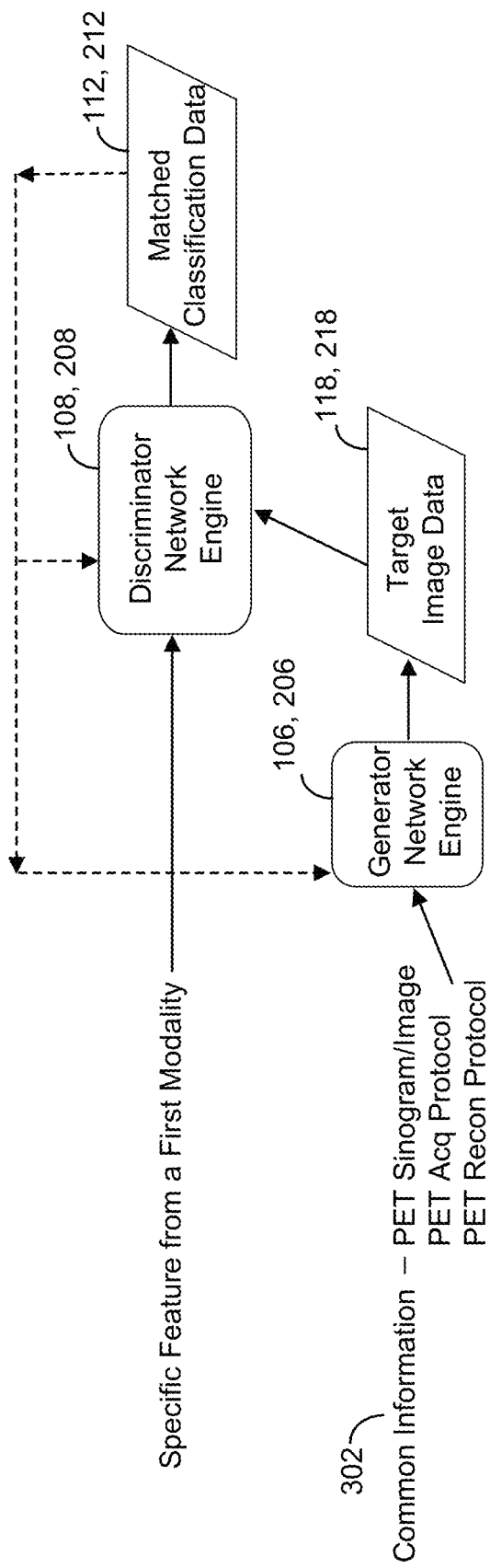
FIGS. 3 and 4 illustrate example portions of the nuclear image systems of FIGS. 1 and 2, in accordance with some embodiments.

FIG. 3 illustrates data flows through various portions of the nuclear imaging systems 100, 200 of FIGS. 1 and 2. For example, as illustrated in FIG. 3, generator network engine 106, 206 can receive, from PET/CT scanner 102 or PET/MR scanner 104, PET data 302. PET data 302 can include, for example, PET image (e.g., PET sinogram, PET mu-map), PET acquisition protocol data, and PET reconstruction protocol data. In some examples, a deep learning-based text analysis can be trained to analyze textual protocol data (e.g., to determine the organ being scanned). Based on PET data 302, generator network engine 106, 206 can generate target image data 118, 218, as described above with respect to FIGS. 1 and 2.

Discriminator network engine 108, 208 can receive target image data 118, 218 from generator network engine 106, 206. Discriminator network engine 108, 208 can also receive features from a first modality. For example, discriminator network engine 108 can receive CT image 116 from PET/CT scanner 102, while discriminator network engine 208 can receive MR image 122 from PET/MR scanner 104. Based on the features from the first modality and target image data 118, 218, discriminator network engine 108, 208 determines matching classifications. Each of generator network engine 106, 206 and discriminator network engine 108, 208 can be trained on matched classification data 112, 212.

Figure 4:
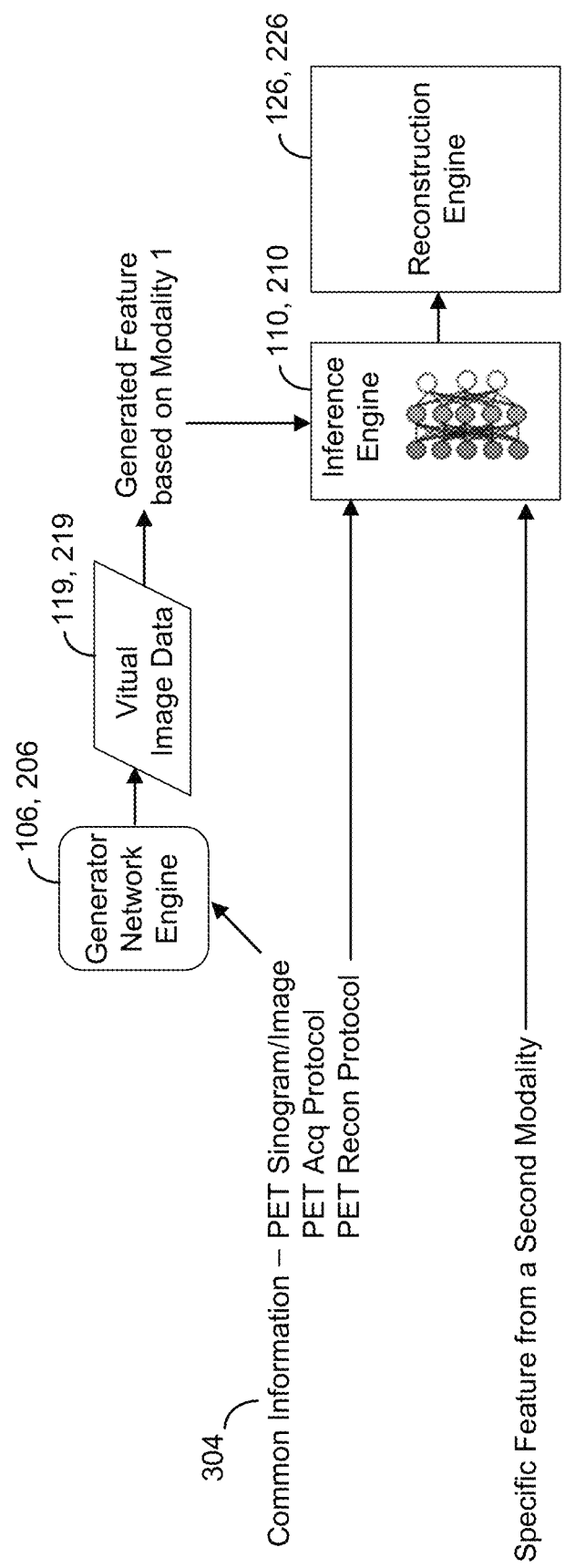

As illustrated in FIG. 4, generator network 106, 206 can receive PET data 304 from a second source (e.g., from PET/CT scanner 102 if PET/MR scanner 104 provided PET data 302 in FIG. 3, or from PET/MR scanner 104 if PET/CT scanner 102 provided PET data 302 in FIG. 3). Generator network 106, 206 can generate virtual image data 119, 219, which generates features based on machine learning processes trained on data from the first modality. Inference engine 110, 210 receives virtual image data 119, 219 from generator network 106, 206, PET data 304, and features from a second modality (e.g., if the first modality is an MR image, the second modality can be a CT image; if the first modality is a CT image, the second modality can be an MR image). Inference engine 110, 210 can apply one or more deep learning processes, as described above, to generate a CT-based MR image (e.g., CT-based MR image data 124), or an MR-based CT image (e.g., MR-based CT image data 224). Reconstruction engine 126, 226 can then reconstruct an image of the second modality with features generated from the first modality, as described above with respect to FIGS. 1 and 2.

Figure 5:
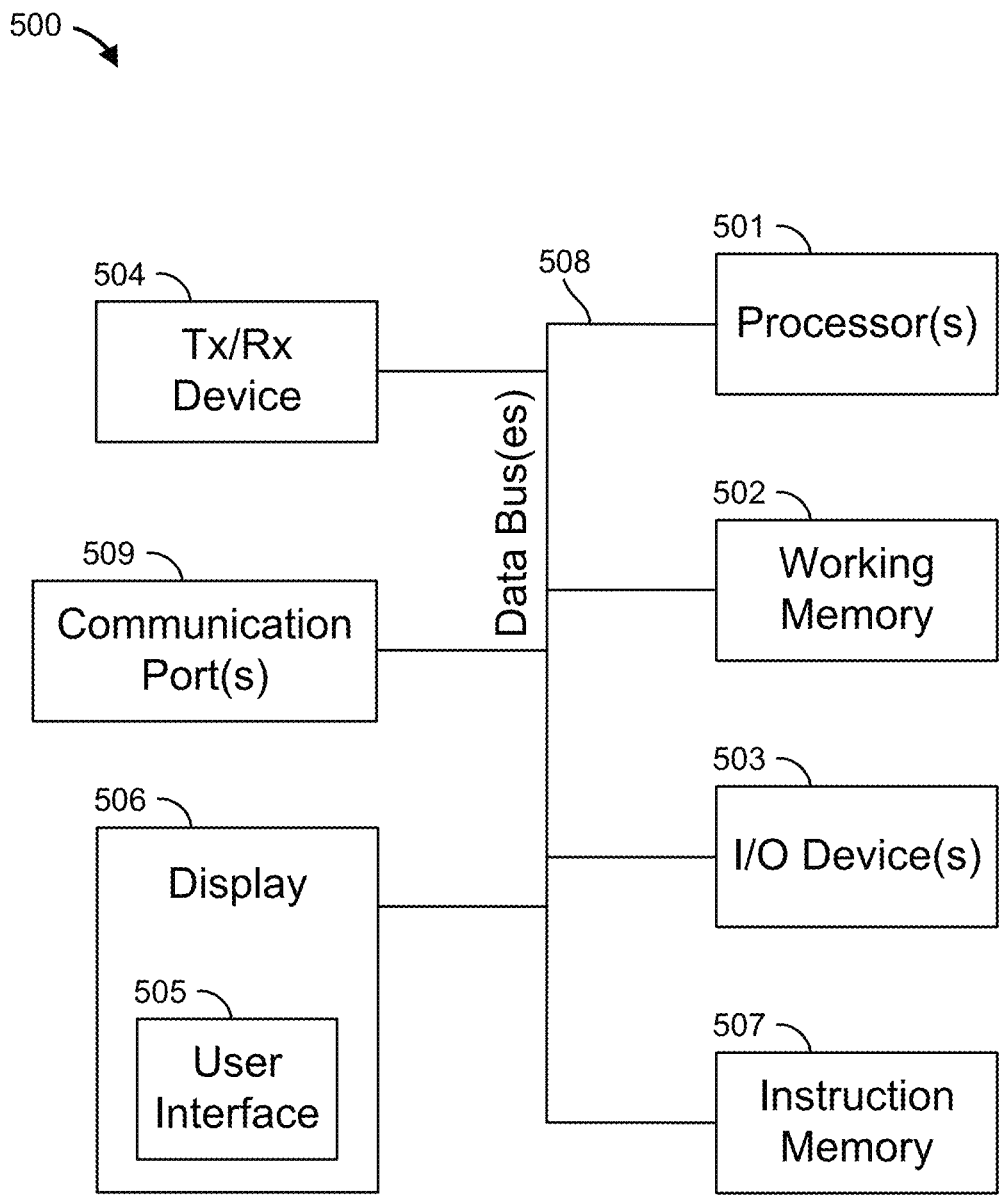
FIG. 5 illustrates a block diagram of an example computing device that can perform one or more functions of the nuclear image systems of FIGS. 1 and 2, in accordance with some embodiments.

FIG. 5 illustrates a modality data transfer computing device 500. Modality data transfer computing device 500 can implement, for example, one or more of the functions described herein. For example, modality data transfer computing device 500 can implement one or more of the functions of generator network engines 106, 206, one or more of the functions of discriminator networks 108, 208, one or more of the functions of inference engines 110, 210, and/or one or more of the functions of reconstruction engines 126, 226.

Modality data transfer computing device 500 can include one or more processors 501, working memory 502, one or more input/output devices 503, instruction memory 507, a transceiver 504, one or more communication ports 509 and a display 506, all operatively coupled to one or more data buses 508. Data buses 508 allow for communication among the various devices. Data buses 508 can include wired, or wireless, communication channels.

Processors 501 can include one or more distinct processors, each having one or more cores. Each of the distinct processors can have the same or different structure. Processors 501 can include one or more central processing units (CPUs), one or more graphics processing units (GPUs), application specific integrated circuits (ASICs), digital signal processors (DSPs), and the like.

Processors 501 can be configured to perform a certain function or operation by executing code, stored on instruction memory 507, embodying the function or operation. For example, processors 501 can be configured to perform one or more of any function, method, or operation disclosed herein.

Instruction memory 507 can store instructions that can be accessed (e.g., read) and executed by processors 501. For example, instruction memory 507 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. For example, instruction memory 507 can store instructions that, when executed by one or more processors 501, cause one or more processors 501 to perform one or more of the functions of generator network engines 106, 206, one or more of the functions of discriminator networks 108, 208, one or more of the functions of inference engines 110, 210, and/or one or more of the functions of reconstruction engines 126, 226.

Processors 501 can store data to, and read data from, working memory 502. For example, processors 501 can store a working set of instructions to working memory 502, such as instructions loaded from instruction memory 507. Processors 501 can also use working memory 502 to store dynamic data created during the operation of modality data transfer computing device 500. Working memory 502 can be a random access memory (RAM) such as a static random access memory (SRAM) or dynamic random access memory (DRAM), or any other suitable memory.

Input-output devices 503 can include any suitable device that allows for data input or output. For example, input-output devices 503 can include one or more of a keyboard, a touchpad, a mouse, a stylus, a touchscreen, a physical button, a speaker, a microphone, or any other suitable input or output device.

Communication port(s) 509 can include, for example, a serial port such as a universal asynchronous receiver/transmitter (UART) connection, a Universal Serial Bus (USB) connection, or any other suitable communication port or connection. In some examples, communication port(s) 507 allows for the programming of executable instructions in instruction memory 507. In some examples, communication port(s) 507 allow for the transfer (e.g., uploading or downloading) of data, such as PET image data, CT image data, and MR image data.

Display 506 can display user interface 505. User interfaces 505 can enable user interaction with modality data transfer computing device 500. For example, user interface 505 can be a user interface for an application that allows for the viewing of MR-based CT images and CT-based MR images. In some examples, a user can interact with user interface 505 by engaging input-output devices 503. In some examples, display 506 can be a touchscreen, where user interface 505 is displayed on the touchscreen.

Transceiver 504 allows for communication with a network, such as a Wi-Fi network, a cellular network, or any other suitable communication network. For example, if operating in a cellular network, transceiver 504 is configured to allow communications with the cellular network. Processor(s) 501 is operable to receive data from, or send data to, a network via transceiver 504.

Figure 6A:
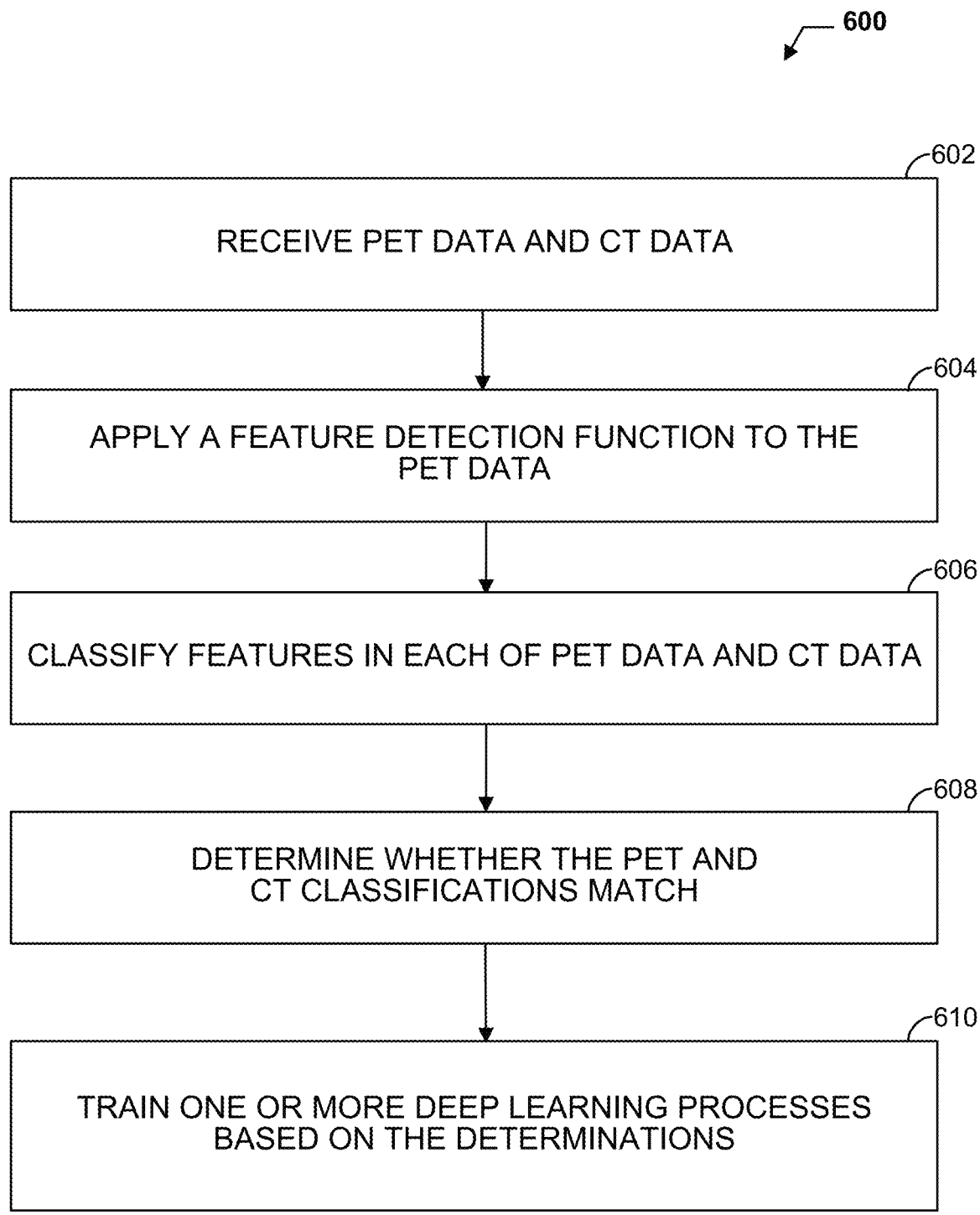
FIGS. 6A and 6B are flowcharts of example methods to reconstruct PET/MR images, in accordance with some embodiments.

FIG. 6A is a flowchart of an example method 600 that can be carried out by, for example, modality data transfer computing device 500. Beginning at step 602, PET image data and CT image data are received. PET image data may identify a PET image, and CT image data may identify a CT image. For example, discriminator network engine 108 can receive a PET image and a CT image from PET/CT scanner 102. At step 604, a feature detection function is applied to the PET data to detect one or more features of the PET image. For example, generator network engine 106 can detect features in the PET image. At step 606, features identified by the PET feature data and the CT feature data are classified. For example, discriminator network engine 108 can apply a CNN to each of the PET image data and the CT image data to classify features. Proceeding to step 608, a determination is made as to whether the classifications match. For example, a determination is made as to whether a classification of the PET image data corresponds to a classification of the CT image data. The determinations are then used, at step 610, to train one or more deep learning processes, such as a deep neural network. For example, the determinations can be used to train one or more of discriminator network engine 108 and generator network engine 106.

Figure 6B:
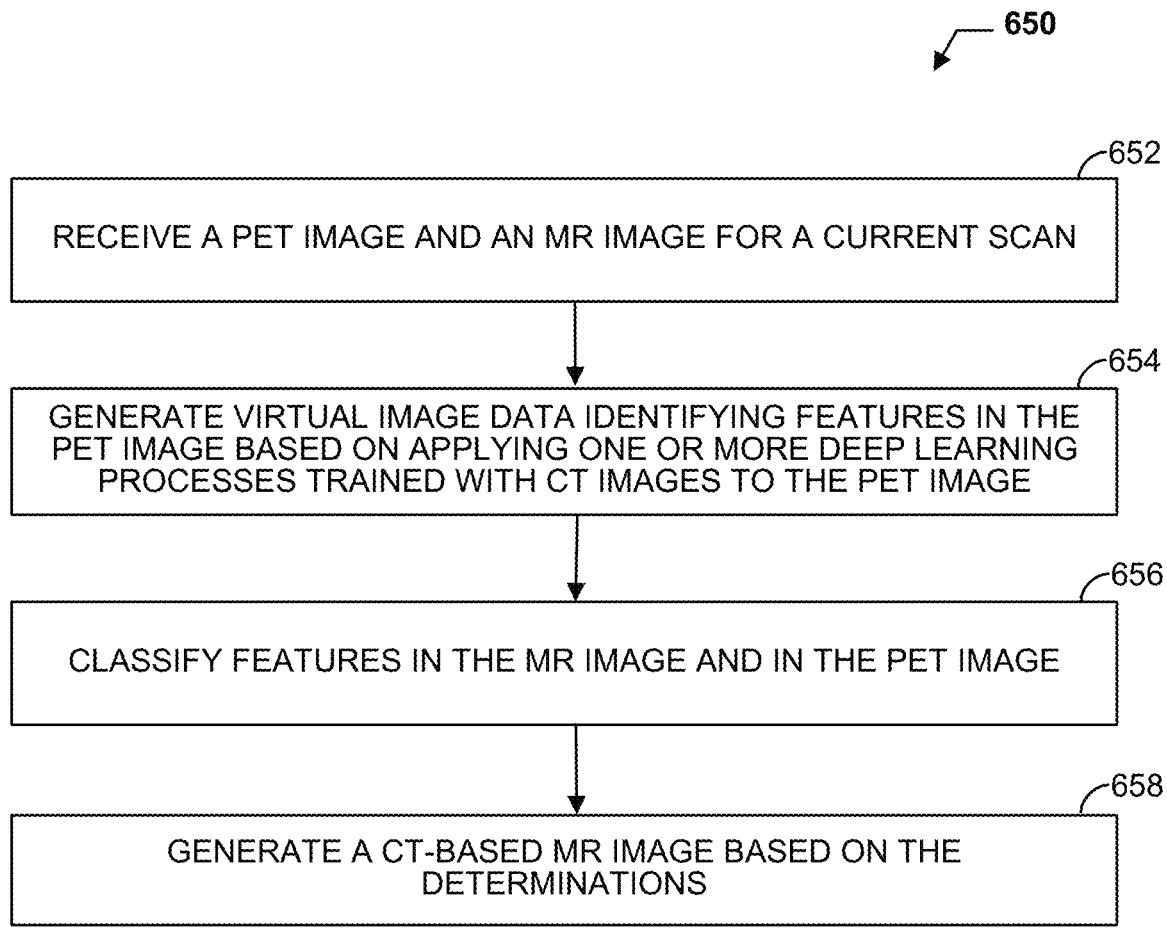

FIG. 6B is a flowchart of an example method 650 that can be carried out by, for example, modality data transfer computing device 500. Method 650, along with, in some examples, method 600, can allow for the reconstruction of a PET/MR image based on knowledge from a PET/CT scanner, such as PET/CT scanner 102, and from a PET/MR scanner, such as PET/MR scanner 104. Beginning at step 652, a PET image and an MR image are received for a current scan. For example, generator network engine 106 can receive a PET image 120, and inference engine 110 can receive MR image 122, from PET/MR scanner 104. At step 654, virtual image data is generated identifying features in the PET image. The virtual image data is generated based on applying one or more deep learning processes trained with CT images to the PET image. For example, generator network engine 106 can generate virtual image data 119 that identifies features in PET image 120.

Proceeding to step 656, features in the MR image and the PET image are classified. For example, inference engine 110 can classify the features in MR image 122 and virtual image data 119. In some examples, classified features are determined for the current scan based on predefined rules. The predefined rules can be based, for example, on the type or purpose of the current scan. At step 658, a CT-based MR image is generated based on the determinations. For example, the CT-based MR image can be MR image 122 updated with image features identified by virtual image data 119. In some examples, a CT-based PET/MR image is generated based on the PET image and the CT-based MR image. For example, PET/MR reconstruction engine 126 can perform an image fusion process to combine PET image 120 and CT-based MR image 124 to generate CT-based PET/MR image 130.

Figure 7A:
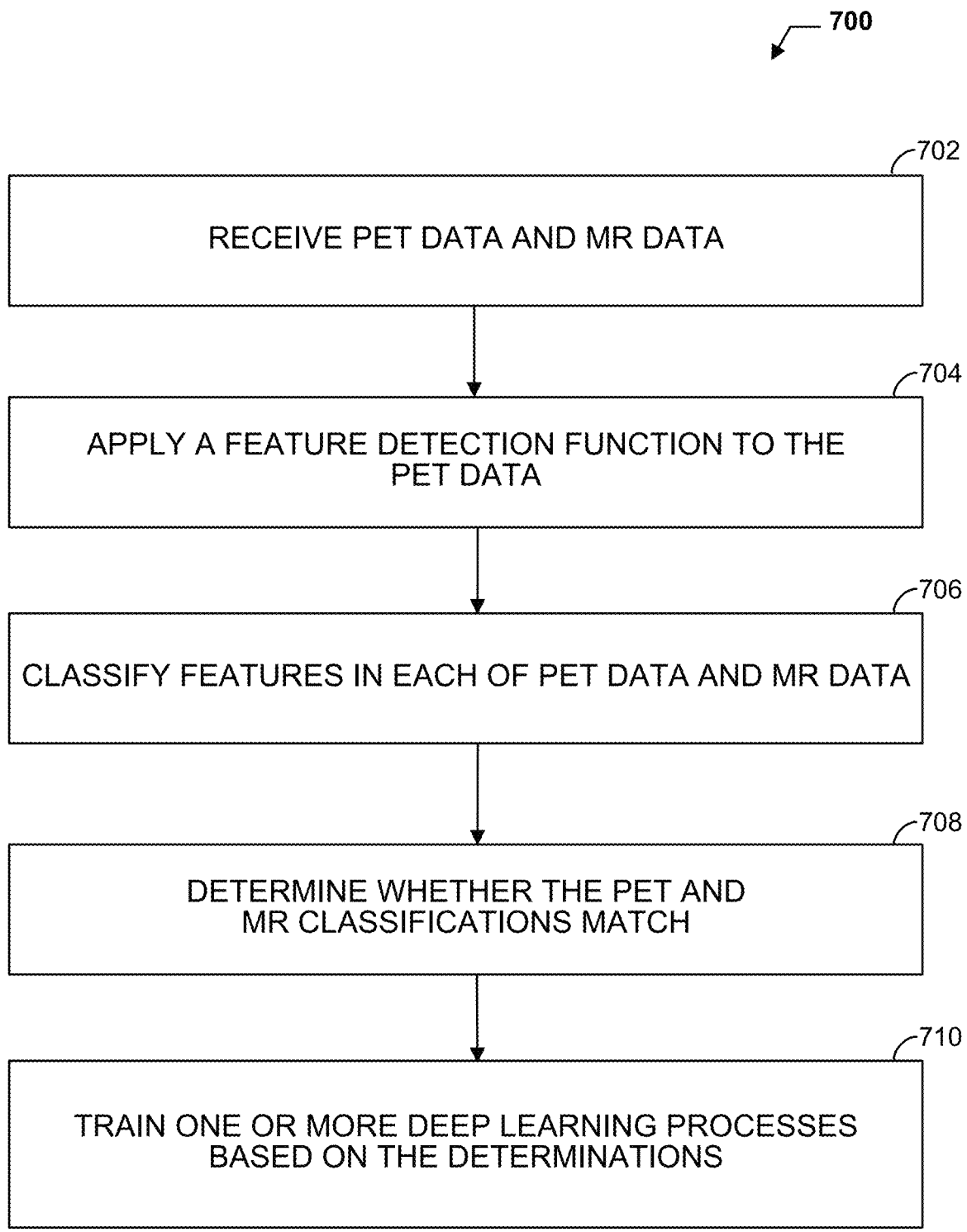
FIGS. 7A and 7B are flowcharts of example methods to reconstruct PET/CT images, in accordance with some embodiments.

FIG. 7A is a flowchart of an example method 700 that can be carried out by, for example, modality data transfer computing device 500. Beginning at step 702, PET image data and MR image data are received. PET image data may identify a PET image, and MR image data may identify an MR image. For example, discriminator network engine 208 can receive a PET image and an MR image from PET/MR scanner 104. At step 704, a feature detection function is applied to the PET data to detect one or more features of the PET image. For example, generator network engine 106 can detect features in the PET image. At step 706, features identified by the PET feature data and the MR feature data are classified. For example, discriminator network engine 208 can apply a CNN to each of the PET image data and the MR image data to classify features. Proceeding to step 708, a determination is made as to whether the classifications match. For example, a determination is made as to whether a classification of the PET image data corresponds to a classification of the MR image data. The determinations are then used, at step 710, to train one or more deep learning processes, such as a deep neural network. For example, the determinations can be used to train one or more of discriminator network engine 208 and generator network engine 206.

Figure 7B:
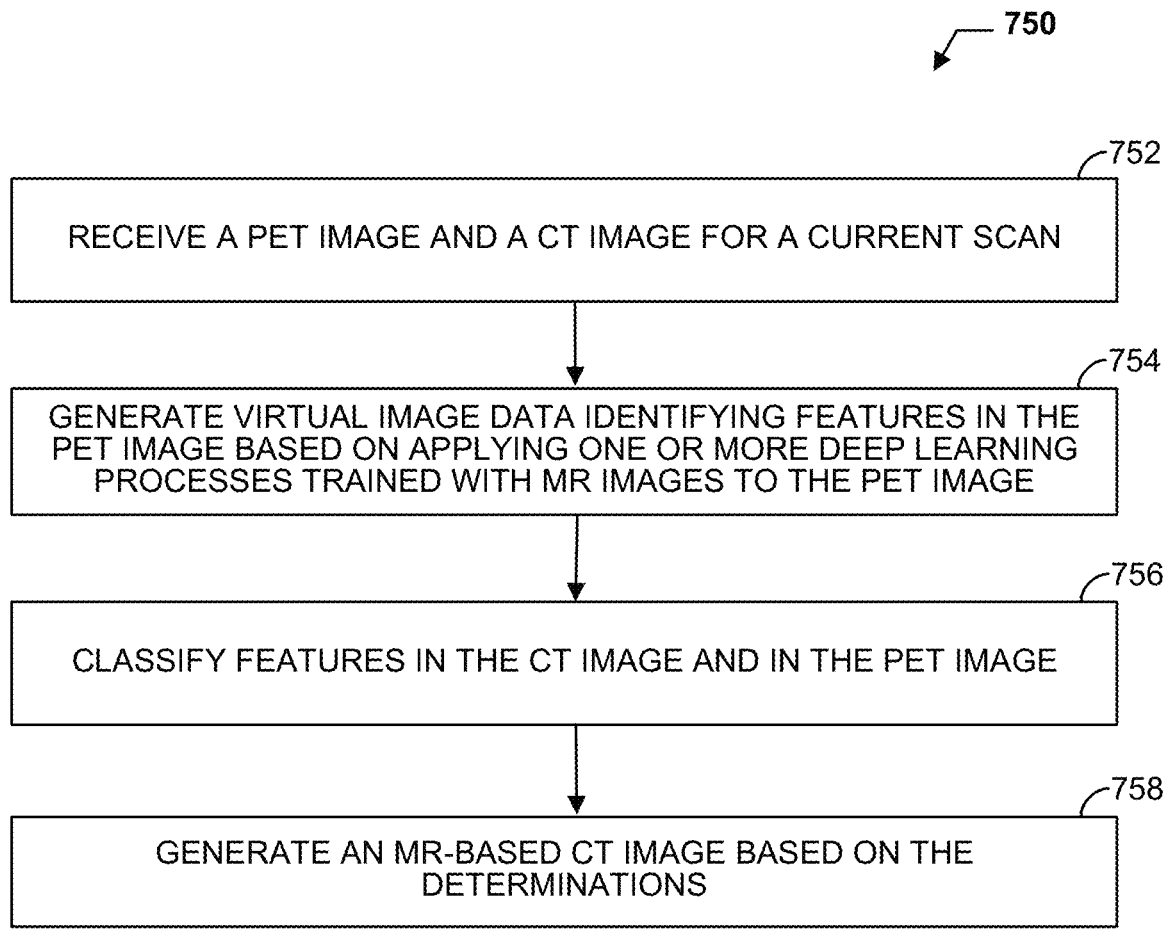

FIG. 7B is a flowchart of an example method 750 that can be carried out by, for example, modality data transfer computing device 500. Method 750, along with, in some examples, method 700, can allow for the reconstruction of a PET/CT image based on knowledge from a PET/MR scanner, such as PET/MR scanner 104, and a PET/CT scanner, such as PET/CT scanner 102. Beginning at step 752, a PET image and a CT image are received for a current scan. For example, generator network engine 206 can receive a PET image 114, and inference engine can receive CT image 116, from PET/CT scanner 102. At step 754, virtual image data is generated identifying features in the PET image. The virtual image data is generated based on applying one or more deep learning processes to the PET image. For example, generator network engine 206 can generate virtual image data 219 that identifies features in PET image 114.

Proceeding to step 756, features in the CT image and the PET image are classified. For example, inference engine 210 can classify the features in CT image 114 and virtual image data 219. In some examples, the classified features are determined for the current scan based on predefined rules. The predefined rules can be based, for example, on the type or purpose of the current scan. At step 758, an MR-based CT image is generated based on the determinations. For example, the MR-based CT image can be CT image 114 updated with image features identified by virtual image data 219. In some examples, an MR-based PET/CT image is generated based on the PET image and the MR-based CT image. For example, PET/CT reconstruction engine 226 can perform an image fusion process to combine PET image 114 and MR-based CT image 224 to generate MR-based PET/CT image 230.

In some examples, a computer-implemented method of training at least one feature detection function, comprising: receiving first image scan data corresponding to a first imaging modality and second image scan data corresponding to a second imaging modality; applying the at least one feature detection function to the received first image scan data to identify at least one feature in the first image scan data; determining a first classification of the at least one feature in the first image scan data and a second classification of at least one feature of the second image scan data; determining whether the first classification of the at least one feature in the first image scan data corresponds to the second classification of the at least one feature of the second image scan data; and training the at least one feature detection function based on the determination of whether the first classification of the at least one feature in the first image scan data corresponds to the second classification of the at least one feature of the second image scan data.

In some examples, the computer-implemented method comprises: receiving third image scan data corresponding to the first imaging modality; and applying the trained at least one feature detection function to the received third image scan data to identify at least one feature in the third image scan data.

In some examples, the first imaging modality is positron emission tomography (PET) from a PET/Computed Tomography (CT) scanner and the first image scan data is first PET data; the second imaging modality is CT from the PET/CT scanner and the second image scan data is CT data; and the third imaging modality is PET from a PET/Magnetic Resonance (MR) scanner and the third image scan data is second PET data.

In some examples, the first imaging modality is PET from a PET/MR scanner and the first image scan data is first PET data; the second imaging modality is MR from the PET/MR scanner and the second image scan data is MR data; and the third imaging modality is PET from a PET/CT scanner and the third image scan data is second PET data.

In some examples, determining the first classification of the at least one feature in the first image scan data comprises applying a convolutional neural network to the at least one feature in the first image scan data.

In some examples, determining whether the first classification of the at least one feature in the first image scan data corresponds to the second classification of the at least one feature of the second image scan data comprises determining whether the first classification matches the second classification.

In some examples, the computer-implemented method comprises: receiving third image scan data corresponding to a third imaging modality; and applying the trained at least one feature detection function to the received third image scan data to identify at least one feature in the third image scan data. In some examples, the first imaging modality is positron emission tomography (PET) from a PET/Computed Tomography (CT) scanner and the first image scan data is first PET data; the second imaging modality is CT from the PET/CT scanner and the second image scan data is CT data; and the third imaging modality is PET from a PET/Magnetic Resonance (MR) scanner and the third image scan data is second PET data. In some examples, the first imaging modality is PET from a PET/MR scanner and the first image scan data is first PET data; the second imaging modality is MR from the PET/MR scanner and the second image scan data is MR data; and the third imaging modality is PET from a PET/CT scanner and the third image scan data is second PET data.

In some examples, a non-transitory computer readable medium stores instructions that, when executed by at least one processor, cause the at least one processor to perform operations comprising: receiving first image scan data corresponding to a first imaging modality and second image scan data corresponding to a second imaging modality; applying at least one feature detection function to the received first image scan data to identify at least one feature in the first image scan data; determining a first classification of the at least one feature in the first image scan data and a second classification of at least one feature of the second image scan data; determining whether the first classification of the at least one feature in the first image scan data corresponds to the second classification of the at least one feature of the second image scan data; and training the at least one feature detection function based on the determination of whether the first classification of the at least one feature in the first image scan data corresponds to the second classification of the at least one feature of the second image scan data.

In some examples, a system comprising an imaging scanner configured to provide first image scan data corresponding to a first imaging modality and second image scan data corresponding to a second imaging modality; and at least one processor communicatively coupled to the imaging scanner and configured to: receive the first image scan data corresponding to the first imaging modality and the second image scan data corresponding to the second imaging modality from the imaging scanner; apply at least one feature detection function to the received first image scan data to identify at least one feature in the first image scan data; determine a first classification of the at least one feature in the first image scan data and a second classification of at least one feature of the second image scan data; determine whether the first classification of the at least one feature in the first image scan data corresponds to the second classification of the at least one feature of the second image scan data; and train the at least one feature detection function based on the determination of whether the first classification of the at least one feature in the first image scan data corresponds to the second classification of the at least one feature of the second image scan data.

In some examples, a computer-implemented method of image reconstruction comprises: receiving first image scan data corresponding to a first imaging modality; applying at least one trained feature detection function to the received first image scan data to generate virtual image data identifying at least one feature in the first image scan data, wherein the at least one trained feature detection function is trained based on training data identifying whether classifications of features corresponding to a second imaging modality and a third imaging modality correspond to each other; receiving second image scan data corresponding to a fourth imaging modality; determining a first classification of the at least one feature in the virtual image data and a second classification of at least one feature in the received second image scan data; and generating third image scan data based on the first classification and the second classification.

In some examples, the training data identifies whether a first classification of at least one feature corresponding to the second modality corresponds to a second classification of at least one feature corresponding to the third modality. In some examples, generating the third image scan data is based on the received first image scan data. In some examples, determining the first classification of the at least one feature in the virtual image data comprises applying a convolutional neural network to the virtual image data. In some examples, generating the third image scan data based on the first classification and the second classification comprises selecting the first classification or the second classification based on at least one pre-defined rule, wherein the third image scan data identifies at least one feature associated with the selected first classification or the selected second classification.

In some examples, the computer-implemented method comprises fusing the third image scan data with the first image scan data to generate a fused image.

In some examples, the first imaging modality is PET from a PET/MR scanner and the first image scan data is first PET data; the second imaging modality is PET from a PET/CT scanner; the third imaging modality is CT from the PET/CT scanner; and the fourth imaging modality is MR from the PET/MR scanner and the second image scan data is MR data.

In some examples, the first imaging modality is PET from a PET/CT scanner and the first image scan data is first PET data; the second imaging modality is PET from a PET/MR scanner; the third imaging modality is MR from the PET/MR scanner; and the fourth imaging modality is CT from the PET/CT scanner and the second image scan data is CT data.

In some examples, a non-transitory computer readable medium stores instructions that, when executed by at least one processor, cause the at least one processor to perform operations comprising: receiving first image scan data corresponding to a first imaging modality; applying at least one trained feature detection function to the received first image scan data to generate virtual image data identifying at least one feature in the first image scan data, wherein the at least one trained feature detection function is trained based on training data identifying whether classifications of features corresponding to a second imaging modality and a third imaging modality correspond to each other; receiving second image scan data corresponding to a fourth imaging modality; determining a first classification of the at least one feature in the virtual image data and a second classification of at least one feature in the received second image scan data; and generating third image scan data based on the first classification and the second classification.

In some examples, the computer readable medium stores instructions that, when executed by the at least one processor, cause the at least one processor to perform operations comprising generating the third image scan data based on the received first image scan data.

In some examples, the computer readable medium stores instructions that, when executed by the at least one processor, cause the at least one processor to perform operations comprising applying a convolutional neural network to the virtual image data to determine the first classification of the at least one feature in the virtual image data.

In some examples, the computer readable medium stores instructions that, when executed by the at least one processor, cause the at least one processor to perform operations comprising selecting the first classification or the second classification based on at least one pre-defined rule, wherein the third image scan data identifies at least one feature associated with the selected first classification or the selected second classification.

In some examples, the computer readable medium stores instructions that, when executed by the at least one processor, cause the at least one processor to perform operations comprising fusing the third image scan data with the first image scan data to generate a fused image.

In some examples, a system comprises an imaging scanner configured to provide first image scan data corresponding to a first imaging modality and second image scan data corresponding to a second imaging modality. The system further comprises at least one processor communicatively coupled to the imaging scanner and configured to: receive the first image scan data corresponding to the first imaging modality from the imaging scanner; apply at least one trained feature detection function to the received first image scan data to generate virtual image data identifying at least one feature in the first image scan data, wherein the at least one trained feature detection function is trained based on training data identifying whether classifications of features corresponding to a third imaging modality and a fourth imaging modality correspond to each other; receive the second image scan data corresponding to the second imaging modality from the imaging scanner; determine a first classification of the at least one feature in the virtual image data and a second classification of at least one feature in the received second image scan data; and generate third image scan data based on the first classification and the second classification.

In some examples, the training data identifies whether a first classification of at least one feature corresponding to the second modality corresponds to a second classification of at least one feature corresponding to the third modality. In some examples, the at least one processor is configured to generate the third image scan data based on the received first image scan data. In some examples, the at least one processor is configured to: apply a convolutional neural network to the virtual image data; and determine the first classification of the at least one feature in the virtual image data based on the application of the convolutional neural network to the virtual image data.

In some examples, the first imaging modality is PET from a PET/MR scanner and the first image scan data is first PET data; the second imaging modality is PET from a PET/CT scanner; the third imaging modality is CT from the PET/CT scanner; and the fourth imaging modality is MR from the PET/MR scanner and the second image scan data is MR data.

In some examples, the first imaging modality is PET from a PET/CT scanner and the first image scan data is first PET data; the second imaging modality is PET from a PET/MR scanner; the third imaging modality is MR from the PET/MR scanner; and the fourth imaging modality is CT from the PET/CT scanner and the second image scan data is CT data.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein can be applied to other embodiments without the use of inventive faculty. The present disclosure is not intended to be limited to the embodiments shown herein, but is to be accorded the widest scope consistent with the principles and novel features disclosed herein.

What is claimed is:

1. A computer-implemented method of image reconstruction, comprising:

receiving first image scan data corresponding to a first imaging modality;

applying at least one trained feature detection function to the received first image scan data to generate virtual image data identifying at least one feature in the first image scan data, wherein the at least one trained feature detection function is trained based on training data identifying whether classifications of features corresponding to a second imaging modality and a third imaging modality classify as a same feature, wherein the second imaging modality and the third imaging modality differ;

receiving second image scan data corresponding to a fourth imaging modality;

determining a first classification of the at least one feature in the virtual image data and a second classification of at least one feature in the received second image scan data; and generating third image scan data based on the first classification and the second classification.

2. The computer-implemented method of claim 1 wherein the training data identifies whether a first classification of at least one feature corresponding to the second modality corresponds to a second classification of at least one feature corresponding to the third modality.

3. The computer-implemented method of claim 1 wherein generating the third image scan data is based on the received first image scan data.

4. The computer-implemented method of claim 1 wherein determining the first classification of the at least one feature in the virtual image data comprises applying a convolutional neural network to the virtual image data.

5. The computer-implemented method of claim 1 wherein generating the third image scan data based on the first classification and the second classification comprises selecting the first classification or the second classification based on at least one pre-defined rule, wherein the third image scan data identifies at least one feature associated with the selected first classification or the selected second classification.

6. The computer-implemented method of claim 1 further comprising fusing the third image scan data with the first image scan data to generate a fused image.

7. The computer-implemented method of claim 1 wherein:
the first imaging modality is PET from a PET/MR scanner and the first image scan data is first PET data;
the second imaging modality is PET from a PET/CT scanner;
the third imaging modality is CT from the PET/CT scanner; and
the fourth imaging modality is MR from the PET/MR scanner and the second image scan data is MR data.

8. The computer-implemented method of claim 1 wherein:
the first imaging modality is PET from a PET/CT scanner and the first image scan data is first PET data;
the second imaging modality is PET from a PET/MR scanner;
the third imaging modality is MR from the PET/MR scanner; and
the fourth imaging modality is CT from the PET/CT scanner and the second image scan data is CT data.

9. A non-transitory computer readable medium storing instructions that, when executed by at least one processor, cause the at least one processor to perform operations comprising:

receiving first image scan data corresponding to a first imaging modality;

applying at least one trained feature detection function to the received first image scan data to generate virtual image data identifying at least one feature in the first image scan data, wherein the at least one trained feature detection function is trained based on training data identifying whether classifications of features corresponding to a second imaging modality and a third imaging modality classify as a same feature, wherein the second imaging modality and the third imaging modality differ;

receiving second image scan data corresponding to a fourth imaging modality;

determining a first classification of the at least one feature in the virtual image data and a second classification of at least one feature in the received second image scan data; and generating third image scan data based on the first classification and the second classification.

10. The computer readable medium of claim 9 storing further instructions that, when executed by the at least one processor, cause the at least one processor to perform operations comprising generating the third image scan data based on the received first image scan data.

11. The computer readable medium of claim 9 storing further instructions that, when executed by the at least one processor, cause the at least one processor to perform operations comprising applying a convolutional neural network to the virtual image data to determine the first classification of the at least one feature in the virtual image data.

12. The computer readable medium of claim 9 storing further instructions that, when executed by the at least one processor, cause the at least one processor to perform operations comprising selecting the first classification or the second classification based on at least one pre-defined rule, wherein the third image scan data identifies at least one feature associated with the selected first classification or the selected second classification.

13. The computer readable medium of claim 9 storing further instructions that, when executed by the at least one processor, cause the at least one processor to perform operations comprising fusing the third image scan data with the first image scan data to generate a fused image.

14. A system comprising:
an imaging scanner configured to provide first image scan data corresponding to a first imaging modality and second image scan data corresponding to a second imaging modality; and
at least one processor communicatively coupled to the imaging scanner and configured to:
receive the first image scan data corresponding to the first imaging modality from the imaging scanner;
apply at least one trained feature detection function to the received first image scan data to generate virtual image data identifying at least one feature in the first image scan data, wherein the at least one trained feature detection function is trained based on training data identifying whether classifications of features corresponding to a third imaging modality and a fourth imaging modality classify as a same feature, wherein the second imaging modality and the third imaging modality differ;
receive the second image scan data corresponding to the second imaging modality from the imaging scanner;

determine a first classification of the at least one feature in the virtual image data and a second classification of at least one feature in the received second image scan data; and generate third image scan data based on the first classification and the second classification.

15. The system of claim 14 wherein the training data identifies whether a first classification of at least one feature corresponding to the second modality corresponds to a second classification of at least one feature corresponding to the third modality.

16. The system of claim 14 wherein the at least one processor is configured to generate the third image scan data based on the received first image scan data.

17. The system of claim 14 wherein the at least one processor is configured to:
- apply a convolutional neural network to the virtual image data; and
- determine the first classification of the at least one feature in the virtual image data based on the application of the convolutional neural network to the virtual image data.

18. The system of claim 14 wherein:
- the first imaging modality is PET from a PET/MR scanner and the first image scan data is first PET data;
- the second imaging modality is PET from a PET/CT scanner;
- the third imaging modality is CT from the PET/CT scanner; and
- the fourth imaging modality is MR from the PET/MR scanner and the second image scan data is MR data.

19. The system of claim 14 wherein:
- the first imaging modality is PET from a PET/CT scanner and the first image scan data is first PET data;
- the second imaging modality is PET from a PET/MR scanner;
- the third imaging modality is MR from the PET/MR scanner; and
- the fourth imaging modality is CT from the PET/CT scanner and the second image scan data is CT data.

20. The system of claim 14 further comprising a second imaging scanner configured to provide fourth image scan data corresponding to the third imaging modality and fifth image scan data corresponding to the fourth imaging modality, wherein the at least one processor is communicatively coupled to the second imaging scanner and configured to:
- receive the fourth image scan data corresponding to the third imaging modality and the fifth image scan data corresponding to the fourth imaging modality from the second imaging scanner;
- determine a third classification of at least one feature in the fourth image scan data and a fourth classification of at least one feature in the fifth image scan data;
- determine whether the third classification of the at least one feature in the fourth image scan data corresponds to the fourth classification of the at least one feature in the fifth image scan data; and
- generate the training data based on the determination of whether the third classification of the at least one feature in the fourth image scan data corresponds to the fourth classification of the at least one feature in the fifth image scan data.

* * * * *